(No Model.)

G. C. SHERMAN.
FLOUR BIN AND SIEVE.

No. 510,996. Patented Dec. 19, 1893.

Attest:
George L. Cragg
John Barrett Jr.

Inventor
George C. Sherman
By Barton & Brown
Attys.

THE NATIONAL LITHOGRAPHING COMPANY,
WASHINGTON, D. C.

UNITED STATES PATENT OFFICE.

GEORGE C. SHERMAN, OF CHICAGO, ILLINOIS, ASSIGNOR TO WILLIS M. SHERMAN AND FRED H. BUTLER, OF SAME PLACE.

FLOUR BIN AND SIEVE.

SPECIFICATION forming part of Letters Patent No. 510,996, dated December 19, 1893.

Application filed July 26, 1892. Serial No. 441,245. (No model.)

*To all whom it may concern:*

Be it known that I, GEORGE C. SHERMAN, a citizen of the United States, residing at Chicago, in the county of Cook and State of Illinois, have invented a certain new and useful Improvement in Flour Bins and Sieves, (Case No. 2,) of which the following is a full, clear, concise, and exact description, reference being had to the accompanying drawings, forming a part of this specification.

My invention relates to an improvement in flour bins, and it has for its object the combination of a sieve with a flour bin in such manner that the sieve will be relieved of the weight of the flour in the bin, but the flour will at all times, without any liability to pack, be brought in contact with the sieve and made to pass through the sieve whenever the sieve is shaken.

My invention consists in a flour bin provided with a sieve adapted to be given a horizontal rocking movement by means of a handle passing through the side of the bin, and an annular shelf above said sieve, the sides thereof making a slight angle with the horizontal; whereby the weight of the bulk of the flour may be removed from the sieve, while at the same time properly directing the flour to the sieve, and a funnel shaped rim beneath the sieve adapted to direct the flour to the removable box at the bottom of the bin.

My invention will be more perfectly understood by reference to the accompanying drawings, in which—

Figure 1:
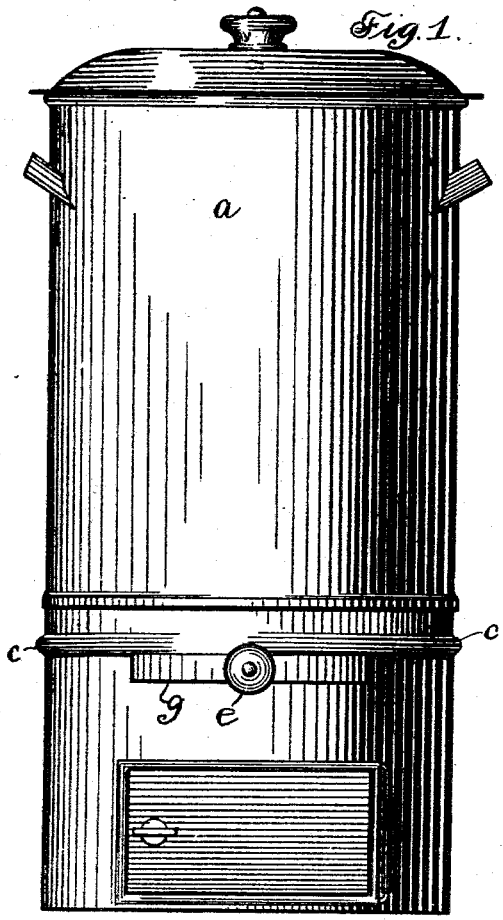
Figure 2:
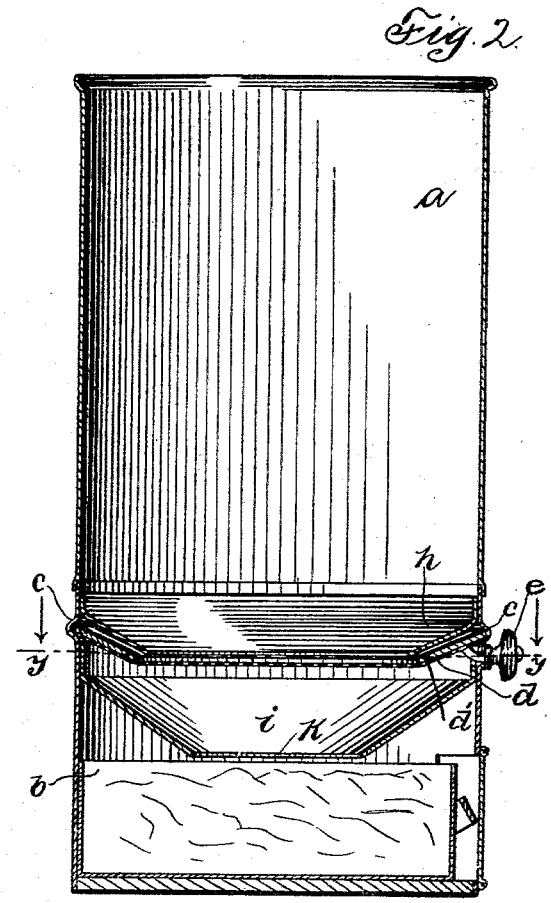
Figure 3:
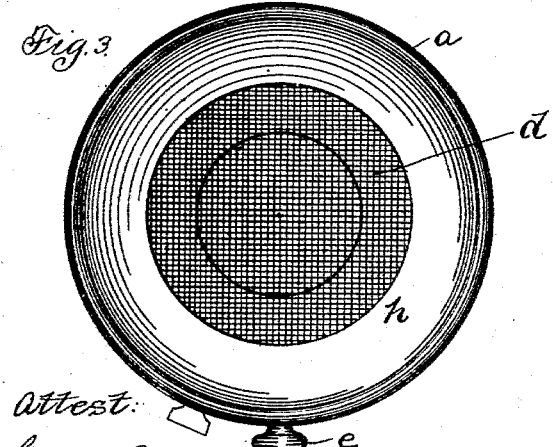
Figure 4:
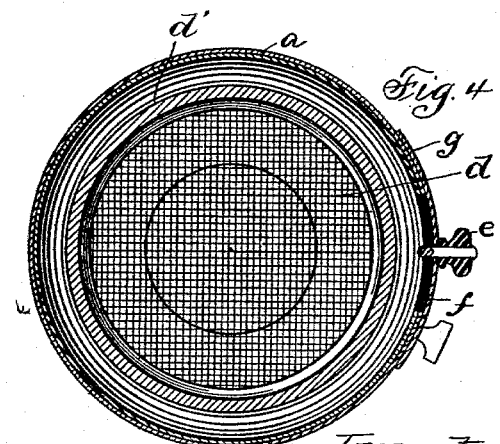

Figure 1 is an elevation of the complete device. Fig. 2 is a section thereof. Fig. 3 is a top view with the cover removed. Fig. 4 is a section of same on line $y\ y$ of Fig. 2.

Similar letters of reference refer to similar parts in the different views.

The bin $a$ is preferably made of tin. In the lower portion of this bin, but sufficiently high to permit the use of a box $b$, I place the swage $c$ in which I rest the circular sieve $d$ having a handle $e$ attached thereto and projecting through the front of the bin. I provide in the lower part of the bin a slot $f$, preferably in ordinary sized bins about three inches long, and upon the knob or handle $e$ I place the strip $g$, which serves to cover this slot. This strip $g$ I make approximately twice the length of the slot, so that it covers the slot when the knob is moved to either limit of its throw.

I preferably make the sieve $d$ of the form shown, mounting the sieve upon the circular piece $d'$, which fits the swage $c$ in the bin. I place in the interior of the bin and just above the sieve the annular shelf $h$ whose sides make a small angle with the horizontal which serves to relieve the sieve of the weight of the flour and also directs the flour to the sieve itself, which is below the swage $c$, and thus keeps the flour from working up and into the swage. The slope given to the sides of the annular shelf $h$ is such that the flour above said shelf may be supported thereby, and not merely serve to direct the flour to the sieve. If the slope of the sides be great the flour will not be supported thereby and the sieve will not only have to support the column of flour directly above it, but also a portion of that above the sloping sides. In flour bins in which the sieve is stationary this feature is not so objectionable, since the sieve may readily be made of sufficient strength to withstand the weight; but when the sieve is adapted to be rocked back and forth, as shown in the drawings, any increased weight causes greater friction upon the bearing surfaces of the sieve and renders manipulation of the sieve more difficult, and it is therefore desirable to reduce the weight of the flour supported by the sieve. This I have accomplished by giving to the sides but a slight slope.

The funnel shaped rim $i$ having an aperture $k$ of smaller diameter than the diameter of the sieve, directs the flour into the box $b$, whence it may be removed at will.

The advantage of this construction of sieve over the rotating cylinder hitherto generally employed, is in its simplicity and the rapidity with which it works, its cheapness and the ease with which it can be repaired.

The sieve $d$ may be made of cloth or wire screen as preferred.

Numerous modifications of this construction will suggest themselves, and I do not wish to limit myself to the precise form of the various parts shown.

Having thus described my invention, what

I claim as new, and desire to secure by Letters Patent, is—

In a combined flour bin and sieve, the combination with a circular sieve supported in a swage formed in the side of said bin and adapted to be rocked back and forth therein, of a handle secured to said sieve and extending through a slot in said bin, a plate rigidly secured to said handle and adapted to cover said slot, an annular shelf above said sieve having sides forming a slight angle with the horizontal and adapted to support the bulk of the weight of the flour, and a rim beneath said sieve adapted to direct the flour, substantially as described.

In witness whereof I hereunto subscribe my name this 14th day of July, A. D. 1892.

GEORGE C. SHERMAN.

Witnesses:
GEORGE McMAHON,
GEORGE L. CRAGG.